(12) United States Patent
Thibon

(10) Patent No.: US 7,015,972 B2
(45) Date of Patent: Mar. 21, 2006

(54) DEVICE AND METHOD FOR SYNCHRONIZING BROADCAST AUDIO-VISUAL PROGRAMS AND COMPLEMENTARY DATA

(75) Inventor: Jacques Thibon, Paris (FR)

(73) Assignee: Thomson Licensing, Boulogne-Billancourt (FR)

( * ) Notice: Subject to any disclaimer, the term of this patent is extended or adjusted under 35 U.S.C. 154(b) by 499 days.

(21) Appl. No.: 10/276,385

(22) PCT Filed: May 22, 2001

(86) PCT No.: PCT/EP01/05853

§ 371 (c)(1),
(2), (4) Date: Nov. 15, 2002

(87) PCT Pub. No.: WO01/91462

PCT Pub. Date: Nov. 29, 2001

(65) Prior Publication Data

US 2004/0226040 A1 Nov. 11, 2004

(51) Int. Cl.
*H04N 9/475* (2006.01)

(52) U.S. Cl. .................................... 348/515; 348/512
(58) Field of Classification Search ............... 348/515, 348/500, 512, 563, 564; 725/39; H04N 9/475, H04N 5/445
See application file for complete search history.

(56) References Cited

U.S. PATENT DOCUMENTS 5,818,510 A 10/1998 Cobbley et al. ............... 348/7
6,141,678 A 10/2000 Britt, Jr. ...................... 709/200
6,583,821 B1 * 6/2003 Durand ...................... 348/515
6,630,963 B1 * 10/2003 Billmaier ................... 348/515

FOREIGN PATENT DOCUMENTS

| JP | 9-293360 | 11/1997 |
| JP | 2000/48206 | 2/2000 |
| WO | 98/27497 | 6/1998 |
| WO | 99/36863 | 7/1999 |
| WO | 00/05884 | 2/2000 |

OTHER PUBLICATIONS

Patent Abstracts of Japan, vol. 1998, No. 03, Feb. 27, 1998 & JP 9-293360.
Patent Abstracts of Japan, vol. 2000, No. 5, Sep. 14, 2000 & JP 2000/048206.

* cited by examiner

Primary Examiner—Sherrie Hsia
(74) Attorney, Agent, or Firm—Joseph S. Tripoli; Joseph J. Laks; Robert D. Shedd

(57) ABSTRACT

The invention relates to a device and a process for the synchronization of broadcast audiovisual programs and of complementary information. The device comprises an image and/or sound sensing assembly, capable of retrieving at least a semantic element from the content of audio-visual programs being broadcast. It further comprises a unit identifying the semantic elements, connected to a program guide including one or several chronologically arranged lists of data sets respectively associated with the broadcast programs. The identifying unit selects for at least one of the programs being broadcast, the data set which is most probably correlated to the semantic elements. It carries out a prior learning session enabling to select the appropriate data sets from the semantic elements. A synthesizing unit synchronizes the audio-visual programs with the selected data sets.

12 Claims, 2 Drawing Sheets though some stations send signals making it possible to identify the program currently being broadcast, but most of them do not have recourse to such a technique, and the programs concerned are of very minority appeal.

DEVICE AND METHOD FOR SYNCHRONIZING BROADCAST AUDIO-VISUAL PROGRAMS AND COMPLEMENTARY DATA

This application claims the benefit, under 35 U.S.C. § 365, of International Application PCT/EP01/05853, filed May 22, 2001, which was published in accordance with PCT Article 21(2) on Nov. 29, 2001 in French and which claims the benefit of European patent application No. 00401479.1 filed May 25, 2000.

BACKGROUND OF THE INVENTION

The present invention relates to a device and to a process for the synchronization of broadcast audiovisual programs and of complementary information, as well as to corresponding applications.

In interactive television systems, a central server receives from advisory centers a program guide which contains information relating to the programs which are to be broadcast. A television viewer can thus, from his television, directly access the information of interest to him.

A particularly useful and user-friendly system would offer the viewer the possibility of having information relating to the program currently being broadcast displayed live on his screen. This display (superimposed on the picture or spatially offset) would then be automatic, and would last for example for a few seconds, or would be activated by the user.

However, such a system would require synchronization between the program currently being broadcast and the display of the complementary information. Now, usually, the initially intended schedules included in the program guides are purely indicative: it is common for the programs not to start and finish without delays of a few minutes or more with respect to these schedules. It even happens that some programs are withdrawn at the last moment, for example when a station chooses to broadcast the end of a sports event until well after the envisaged end schedule, to the detriment of the next transmission. It is therefore not possible to rely on the schedule indications provided by the program guides in order to hope to match up the broadcast audiovisual programs and the displaying of corresponding complementary information.

Of course, at the present time some stations send signals making it possible to identify the program currently being broadcast, but most of them do not have recourse to such a technique, and the programs concerned are of very minority appeal.

SUMMARY OF THE INVENTION

The present invention proposes a device and a process for the synchronization of broadcast audiovisual programs and of complementary information, permitting in particular synchronized real-time displaying of the programs and of the complementary information.

The device and the process of the invention also make possible audible broadcasting of the complementary information (for example for the hard of hearing), which can interrupt the audible broadcasting of a program for a short instant or, optionally, be superimposed thereon with a higher intensity.

The device and the process of the invention also have applications based on the use of complementary information for purposes other than broadcasting, in particular in respect of automatic recordings on video recorders. Other applications relate to the substitution of content of audiovisual programs. Thus, the user can, for example, decide in advance an automatic and real-time replacement on the screen of a certain category of programs (for example transmissions of variety shows) with another (for example fictional films), by means of a selection from several broadcasting sources (several stations, internet, local storage system, etc.).

To this end, the invention relates to a device for the synchronization of broadcast audiovisual programs and of complementary information.

The expression "broadcasting channel" is understood to mean any path or set of paths for communicating information originating from broadcasting means and destined for reception means, corresponding to a given broadcast programming. Moreover, the broadcasting of the audiovisual programs may equally well be performed on the basis of any technique, such as network for broadcasting over the airwaves, satellite, cable, internet or local storage system.

The information set relating to each program contains significant information pertaining to this program, such as one or more of the following items of information:
provisional start and end schedules,
provisional duration,
title and possibly subtitle,
summary,
parental code,
format,
sound quality,
topic and possibly subtopic,
linguistic version (O.V. or F.V.) etc., this information being used preferably by the recognition unit during the operations of correlation with the semantic elements extracted from the pictures and/or from the sounds. An information set also comprises other details, useful for knowledge of the program (hence for example for real-time display) but of little consequence for the recognition of the semantic elements and hence preferably not used for correlation, for example:
director, screenplay writer, composer,
list of actors and respective roles,
year of production,
country of origin, etc.

As far as the semantic elements extracted are concerned, they are elements which are significant with regard to recognition, that is to say for matching these semantic elements with the information used. Thus, they advantageously comprise:
a family of shapes (for example a ball in motion to identify a football match, middle distance shots of busts to identify debates or presenters, etc.),
a sound level (for example a higher sound level to identify advertisements), a pace of motion (for example a fast pace to identify advertisements and a slow one to identify a studio debate), a family of visual signs (for example a sign of parental authorization to identify the type of film broadcast) or of audible signs (for example a violin tone to identify certain generic ones) etc.

Picture and/or sound detection and recognition of semantic elements is implemented by means of techniques which are in themselves known. In particular, the correlation of the semantic elements with the available information advantageously uses artificial intelligence methods constructed for example around neural networks (association between artificial intelligence engine and auto-learning). The device of the invention nevertheless imposes on these recognition techniques the constraint of choosing from an ordered list, this amounting basically to positioning a pointer in this list.

This constraint relating to the lists of the program guide makes recognition possible, since it imposes a framework limited to the domain of analysis.

Moreover, the capacity for recognition is acquired by means of learning, and is not programmed a priori. This learning allows the system every flexibility and permits the consideration of a large number of parameters related to the picture and to the sound of the programs broadcast (semantic elements) and to the information utilized (information set). Thus, despite all the uncertainties related to this or that particular parameter, the parameters as a whole set can provide reliable results. The latter are manifested by the most significant probability with regard to the positioning of the pointer in each list, which corresponds to the strongest correlation between the semantic elements and the information sets in the list.

The invention is thus based on the combination of three nested functions:

picture and/or sound detection leading to the production of semantic elements, recognition of the semantic elements, and selection of information from a chronologically ordered list by virtue of the recognition of the semantic elements and under constraint of an order relation (chronology of the programs).

An important advantage of the invention is that it does not need any particular means to be implemented at transmission level, it being possible for the identification of the appropriate information to be carried out entirely on reception, whether the latter be final (terminals, such as interactive televisions) or intermediate (servers).

The device according to the invention is preferably located geographically in a central server, intended for making the details obtained available to the reception means. The central server then advantageously performs in a systematic manner the synchronization with regard to a selection of stations, and transmits the information to the users automatically (for example on each change of station for a few seconds) and/or on request.

Preferably, the positioning of the pointer in each of the ordered lists is necessarily carried out in one direction only, towards a rank higher than or equal to the current position of the pointer. This amounts to forcing the choice of the elements relating to the current program or to a later program—except in the case when the list is updated. This additional constraint eases the recognition operations, at the cost of an additional restriction with regard to the determination of the relevant information sets.

The initial positioning of the pointer in the list is advantageously obtained by means of schedules indicated in the program guide and of the current time.

Moreover, the synthesis block advantageously takes account of the information set selected last for updating the indicator. This scheme may allow optimal positioning of the indicators over time, and hence may enable the determination of the current indicator to be made more certain and more effective. However, it implies that the updating is done continuously. Moreover, should there be an error in the automatic selecting of an indicator, there is a risk of this error having a knock-on effect on the later choices through lower effectiveness or through new errors. In another mode of updating, the synthesis block uses the schedules indicated in the program guide for a default positioning. The two forms of updating are advantageously combined, the indicator of each list preferably having its position modified whenever the updating by schedule or by selection leads to a position later than the current position in the list—this modification does not affect the information set currently in use, but only the recognition operations.

The synchronization device is for example implemented periodically, in time slots close to the start and end times indicated in the program guides and/or at the request of users.

In another form of selection of the information set, this order relation constraint is not imposed. A reversal of programs is thus made possible, this occurring perhaps for example in the presence of sports programs broadcast live.

In yet other forms of selection of the information sets, use is also made of the indicators of the current information sets, but with other types of constraints. For example, backward movements through the lists are permitted, but limited to one or two units and/or forward jumps are permitted (at least two units), but restricting them to two or three units.

It also pertains to a process for the synchronization of broadcast audiovisual programs and of complementary information.

BRIEF DESCRIPTION OF THE DRAWINGS

The invention will be better understood and illustrated by the embodiments and modes of implementation set forth hereinbelow, which are in no way limiting, with reference to the appended figures in which.

DETAILED DESCRIPTION OF THE PREFERRED EMBODIMENTS

Figure 1:
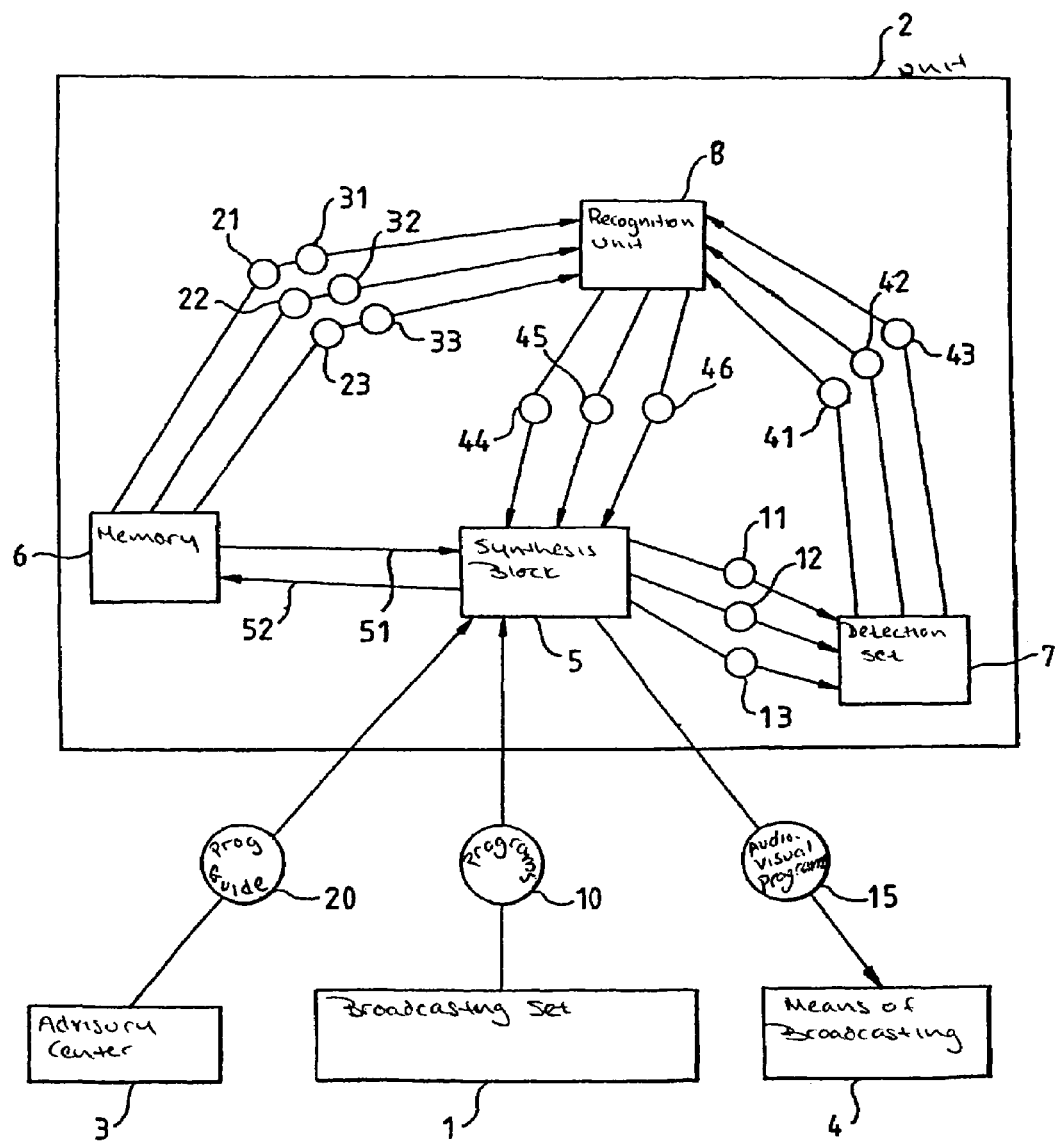
FIG. 1 is a schematic diagram showing a synchronization device according to the invention, in its environment.

The central unit 2 (FIG. 1) of a receiver of audiovisual programs 10 is intended to receive the content of the programs 10 originating from a broadcasting set 1 (for example a radiobroadcaster) and to have access to a program guide 20 of an advisory center 3 (for example a dedicated service provider). The central unit 2 is then able to produce on the basis of the programs 10 and of information from the advisory center 3, audiovisual programs 15 broadcast with synchronized complementary information, and to communicate these programs 15 to means of broadcasting 4 on the screen.

The central unit 2 more precisely comprises:

a synthesis block 5, responsible for controlling all the operations and in particular for synchronizing the programs 10 with selected information, a memory 6, designed to store information relating to the program guide 20 and for the extraction of appropriate information from this guide 20, a picture and/or sound detection set 7, capable of extracting one or more semantic elements 41–43 (family of shapes, sound level, pace of motion, etc.) from the content of the programs 10 currently being broadcast, and a recognition unit 8 for recognizing semantic elements, which is designed to match up the semantic elements 41–43 identified and information emanating from the program guide 20.

Figure 2:
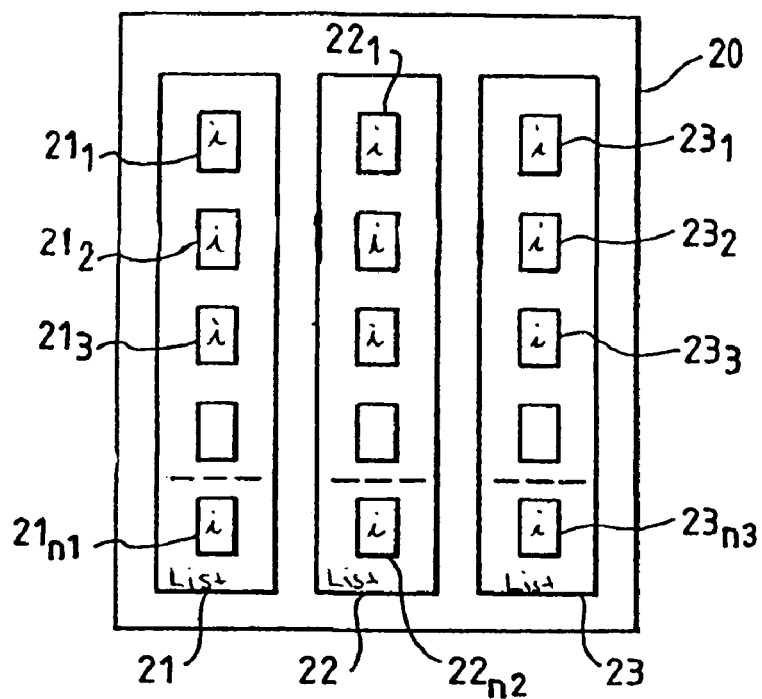
FIG. 2 represents a program guide used by the device of FIG. 1.

The recognition unit 8 operates on the basis of chronologically ordered lists 21, 22 and 23 (FIG. 2) of information sets (schedules, duration, title, summary, etc.) respectively referenced $21_1$–$21_{n1}$, $22_1$–$22_{n2}$ and $23_1$–$23_{n3}$, provided by the program guide 20. Each of the lists 21 to 23 is associated with a broadcasting channel (television station) and its information sets $21_1$–$21_{n1}$, $22_1$–$22_{n2}$ and $23_1$–$23_{n3}$ relate respectively to audiovisual programs 10 broadcast on this channel.

Since a program 11, 12 or 13 is currently being broadcast on one of the broadcasting channels, associated respectively with the list 21, 22 or 23 of the program guide 20, the recognition unit 8 is capable of selecting respectively the information set 44, 45 or 46 of this list which is the one most probably correlated with the semantic elements 41, 42 or 43 extracted from this program by the detection set 7. This recognition unit 8 is intended for performing a prior learning enabling it, by means of learning materials comprising semantic elements and associated information, to make the most judicious selections. This learning is advantageously continued during use. For selection with prior learning, the recognition unit 8 implements for example neural network techniques associated with an artificial intelligence engine.

Figure 3:
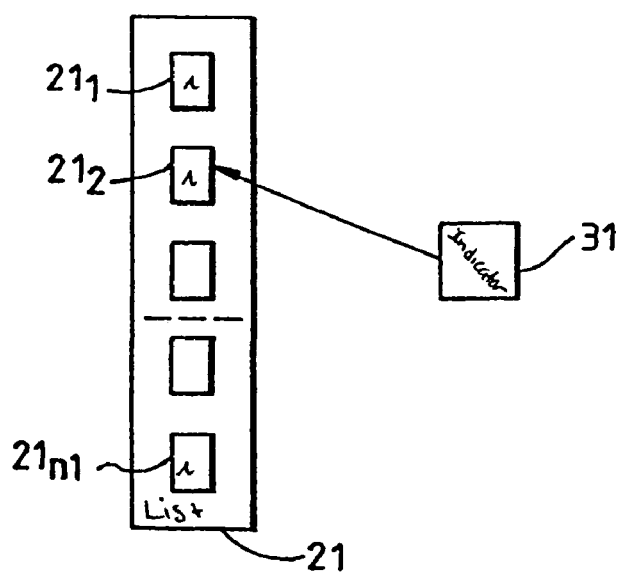
FIG. 3 illustrates the basic manner of operation of the pointing of one of the indicators used in the device of FIG. 1, to the corresponding list of the program guide of FIG. 2.

In the embodiment represented, an additional constraint involves indicators 31, 32 and 33 (FIGS. 1 and 3) pointing respectively to the current information sets selected from the lists 21, 22 and 23. These indicators 31 to 33, stored in the memory 6, give the information sets corresponding to the audiovisual programs broadcast last respectively on each of the broadcasting channels (for example, the indicator 31 points to the set $21_2$ which corresponds to the program broadcast last on the first station—FIG. 3).

The additional constraint imposed by the recognition unit 8 is for example that the information set to be selected from one of the lists 21, 22 or 23 is situated downstream of the information set pointed at by the indicator 31, 32 or 33. The chronological nature of the lists is thus used to succeed in identifying the appropriate information more certainly and/or more simply. In a variant embodiment, the selecting of a downstream information set is permitted, but provided that the latter is not more than two units away from the current one.

The synthesis block 5 is responsible for updating the indicators 31 to 33 in the memory 6, preferably as a function of the information sets 44 to 46 selected by the recognition unit 8. This updating allows effective application of the constraints imposed on the movements of the indicators 31 to 33.

During operation, the following is undertaken for implementation of the synchronization device as applied to a broadcasting channel (for example the first):

the semantic elements 41 of the program 11 currently being broadcast on the first channel are extracted by means of the detection set 7;

the information set 44 most probably correlated with the semantic elements 41 and complying with the chosen constraint regarding the movement of the indicator 31 associated with the list 21 is selected from the chronologically ordered list 21, associated with the first channel, of information sets by means of the recognition unit 8;

the indicator 31 is updated by means of the synthesis block 5;

and the program 11 is synchronized with the selected information set 44 by means of the synthesis block 5.

What is claimed is:

1. A device for the synchronization of broadcast audiovisual programs and of complementary information, comprising:

a picture and/or sound detection set, capable of extracting at least one semantic element from the content of said audiovisual programs currently being broadcast, a recognition unit for recognizing said semantic elements, which is linked to the detection set and to at least one program guide, said guide comprising for at least one broadcasting channel, respectively at least one chronologically ordered list of information sets respectively associated with audiovisual programs intended to be broadcast on said channel, said recognition unit being capable of selecting for each of said audiovisual programs currently being broadcast on one of said channels, corresponding to one of said ordered lists, the one of said information sets which is most probably correlated with said semantic elements obtained in respect of said audiovisual program, and said recognition unit being intended to perform a prior learning enabling said recognition unit to select said appropriate information sets on the basis of said semantic elements, by means of learning materials comprising semantic elements and associated information, and a synthesis block capable of synchronizing the audiovisual programs currently being broadcast with the selected information sets.

2. The synchronization device as claimed in claim 1, wherein:

said device comprises a memory designed to contain at least one indicator of the information set corresponding to the audiovisual program broadcast last, respectively for each of said lists, the recognition unit is capable of selecting said information set from said ordered list for each of said channels, in such a way that said information set is positioned in said ordered list at a rank higher than or equal to the rank of the information set pointed at by the indicator associated with said ordered list, and the synthesis block is intended for updating said indicators in the memory.

3. The synchronization device as claimed in claim 2, wherein the recognition unit is capable of selecting from the ordered lists, information sets having a rank at least two units higher than the information sets pointed at by said indicators.

4. The synchronization device as claimed in claim 1, wherein the recognition unit is intended also to perform said learning during use.

5. The synchronization device as claimed in claim 1, wherein said semantic elements are chosen from
a family of shapes,
a sound level,
a pace of motion,
a family of visual and/or audible signs,
and any combination of said semantic elements.

6. The synchronization device as claimed in claim 1, wherein the recognition unit comprises at least one neural network, intended for receiving as input at least said semantic elements and for producing as output at least a result representative of information correlated with said semantic elements.

7. The synchronization device as claimed in claim 1, wherein said information sets comprise at least one value giving provisional time information regarding the broadcasting of the associated audiovisual programs.

8. The application of the synchronization device as claimed in claim 1 to a screen display of details regarding audiovisual programs currently being broadcast.

9. The application of the synchronization device as claimed in claim 1 to an automatic recording of audiovisual programs by video recorder.

10. The application of the synchronization device as claimed in claim 1 to a substitution of content of audiovisual programs.

11. A process for the synchronization of broadcast audiovisual programs and of complementary information, comprising the following steps:

extraction of at least one semantic element by means of a picture and/or sound detection set from the content of audiovisual programs currently being broadcast, selection by means of a recognition unit, from a chronologically ordered list of information sets respectively associated with audiovisual programs intended to be broadcast on a broadcasting channel, for each of said audiovisual programs currently being broadcast on said broadcasting channel, the one of said information sets which is most probably correlated with said semantic elements obtained in respect of said audiovisual program, and synchronization of the audiovisual programs currently being broadcast by means of a synthesis block with the selected information sets.

12. The synchronization process according to claim 11, said synchronization process being implemented by means of a synchronization device in accordance with claim 1.

* * * * *